May 25, 1948.  A. C. SCHULTZ  2,442,249
PIPE PULLER
Filed Oct. 6, 1947
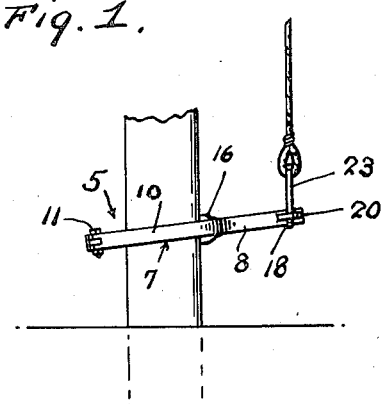
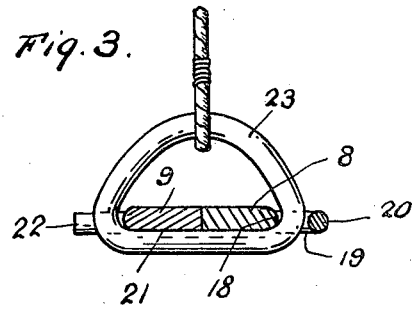
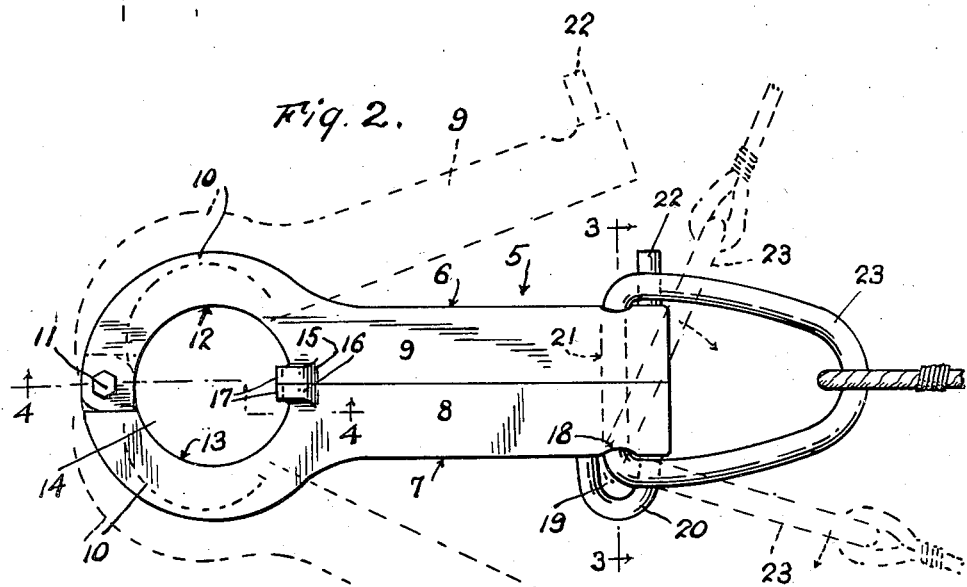
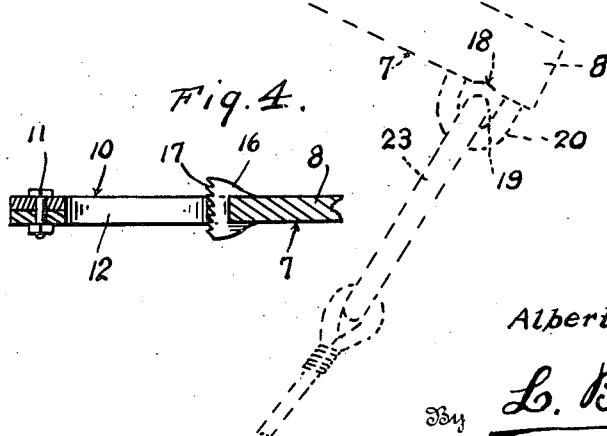
Inventor
Albert C. Schultz
By L. B. James
Attorney Patented May 25, 1948

2,442,249

UNITED STATES PATENT OFFICE 2,442,249

PIPE PULLER

Albert C. Schultz, Protection, Kans.

Application October 6, 1947, Serial No. 778,249

2 Claims. (Cl. 294—92)

This invention relates to grapples and more particularly a pipe puller.

One of the objects of this invention resides in the provision of a pipe puller adapted to be easily clamped around well pipes and the like at any accessible points thereof.

Another object of this invention resides in the particular construction of the pipe engaging jaws of the pipe puller.

A further object of this invention resides in the particular construction of the locking means of the jaws.

A still further object of this invention resides in the particular construction of the jaw locking ring and means for limiting its outward swinging movement relative to the jaws.

With these and other objects in view, this invention resides in certain novel features of construction and arrangement of elements to be hereinafter more particularly set forth in the specification, illustrated in the accompanying drawing and pointed out in the appended claims and, although this disclosure depicts my present conception of the invention, the right is reserved to resort to such departures therefrom as come within the scope of the claims.

In the accompanying drawing forming a part of this application;

Fig. 1 is a side view of the pipe puller engaging a portion of a well pipe.

Fig. 2 is a plan view of the pipe puller per se.

Fig. 3 is a vertical sectional view taken approximately on line 3—3 of Fig. 2.

Fig. 4 is a similar view taken approximately on line 4—4 of Fig. 2.

In the present illustration of this invention the numeral 5 designates, in general, a well pipe puller formed of strong metal or the like and consists of companion sections 6 and 7 having elongated shanks 8 and 9 provided with heads 10 connected together by a pivotal bolt 11 and having opposed inner walls 12 and 13 of substantially semi-circular configuration to form a well pipe receiving hole 14 when shanks are locked in operated relation.

Formed on those sides of the aforesaid walls 12 and 13 opposite the pivotal bolt of the heads are companion gripping jaws 15 and 16 of greater width than the thickness of the shanks and, although teeth 17 are herein shown as formed on the jaws for secure engagement with well pipes, rods and the like, the gripping areas thereof may be smooth or otherwise formed to perform functions similar thereto.

Formed in the outer side wall of the shank 8 adjacent its end is a substantially semi-circular groove 18 communicating with an aperture 19 in a lug 20 projecting from said side of the shank while formed in the lower edge of the shank 9 in horizontal alignment with the groove 18 is a groove 21 which is disposed inwardly of a stop lug 22 projecting outwardly from the outer side wall of the latter mentioned shank.

Secured to the shank 8 as by passing through the apertured lug 20 therein is a substantially elliptical shape locking and lifting ring 23, the same being of sufficient length that its outer end will pass over the stop lug 22 when locking and unlocking the sections 6 and 7 and, in order to stabilize the ring when pulling on the same by a cable attached thereto, the base portion thereof will rest in the aforesaid grooves.

With this invention fully set forth, it is manifest that a puller is provided which can be quickly and easily disposed around any accessible portion of a well pipe, rod or the like and, through the particular assemblage of elements thereof, operation thereof is safe and positive.

Having thus described my invention, what I claim and desire to protect by Letters Patent is:

1. A well pipe puller comprising companion sections including elongated shanks having heads with substantially semicircular walls disposed in opposed relation to one another, a bolt pivotally securing the sections together at the head ends thereof, companion pipe gripping jaws of greater height than the thickness of the companion sections formed on the same and extending inwardly of those portions of the walls opposite the pivotal bolt of the sections, a laterally extending lug formed on one of the sections adjacent its outer end and having a hole therein disposed in horizontal alignment with grooves in the outer walls of the sections, a substantially elliptical ring passing through the hole in the aforesaid lug and secured to the section having the lug thereon, and a stop lug formed on the other section outwardly of the groove therein and extending outwardly from the side of said section a lesser distance than that between the base and loop portion of the ring to permit it to be swung thereover.

2. A well pipe puller comprising elongated companion sections pivotally connected together at one end and having substantially semi-circular walls forming a pipe receiving hole when in opposed operative relation to one another, perpendicular jaws formed on the sections on that side of the hole opposite the pivotal point of the sections, an apertured lug formed on the outer side of one of the sections adjacent the outer end thereof, an elongated ring passing through the aperture of the lug and secured thereby to that section having the lug thereon, and a stop lug formed and projecting laterally from the outer side of the other section such distance that the ring will pass over the same when turned at right angles to its section locking position.

ALBERT C. SCHULTZ.